United States Patent
Muñoz et al.

(10) Patent No.: US 12,425,519 B2
(45) Date of Patent: Sep. 23, 2025

(54) SYSTEMS AND METHODS FOR RELATIVE GAIN IN PREDICTIVE ROUTING

(71) Applicant: Genesys Cloud Services, Inc., Menlo Park, CA (US)

(72) Inventors: Emir Muñoz, Galway (IE); Apostolos Galanpoulos, Galway (IE); Greg Toth, Galway (IE); David Farrell, Galway (IE); Maciej Dabrowski, Galway (IE)

(73) Assignee: Genesys Cloud Services, Inc., Menlo Park, CA (US)

( * ) Notice: Subject to any disclaimer, the term of this patent is extended or adjusted under 35 U.S.C. 154(b) by 129 days.

(21) Appl. No.: 18/365,577

(22) Filed: Aug. 4, 2023

(65) Prior Publication Data
US 2024/0205336 A1     Jun. 20, 2024

Related U.S. Application Data

(60) Provisional application No. 63/433,538, filed on Dec. 19, 2022.

(51) Int. Cl.
*H04M 3/00*     (2024.01)
*H04M 3/51*     (2006.01)
*H04M 3/523*   (2006.01)

(52) U.S. Cl.
CPC ....... *H04M 3/5233* (2013.01); *H04M 3/5175* (2013.01); *H04M 3/5238* (2013.01); *H04M 2203/402* (2013.01)

(58) Field of Classification Search
CPC . H04M 3/5233; H04M 3/5175; H04M 3/5238
See application file for complete search history.

(56) References Cited

U.S. PATENT DOCUMENTS

| | | |
|---|---|---|
| 2017/0111507 A1 | 4/2017 | McGann et al. |
| 2018/0205828 A1 | 7/2018 | Conway et al. |
| 2021/0377392 A1 | 12/2021 | Traba et al. |
| 2022/0141340 A1 | 5/2022 | Spottiswoode et al. |

OTHER PUBLICATIONS

International Search Report and Written Opinion of the International Searching Authority; ISA/US; International Application No. PCT/US2023/029513; Oct. 27, 2023; 12 pages.

*Primary Examiner* — Rasha S Al Aubaidi
(74) *Attorney, Agent, or Firm* — Taft Stettinius & Hollister LLP

(57) ABSTRACT

A method of routing interactions to contact center agents according to an embodiment includes identifying an interaction to be routed to a contact center agent, determining a predictive routing score for each prospective contact center agent to which the interaction can be routed based on a historical performance of each prospective agent, determining a relative gain for each prospective agent based on an interaction class of the interaction, an agent class performance of the prospective agent, and an agent value of the prospective agent, wherein the relative gain of a respective agent is indicative of a relative optimization improvement of routing the interaction to the respective agent relative to another of the prospective agents, ranking the prospective agents based on the associated predictive routing score and the associated relative gain for each prospective agent, and routing the interaction to an agent selected based on the ranking of the prospective agents.

16 Claims, 7 Drawing Sheets

SYSTEMS AND METHODS FOR RELATIVE GAIN IN PREDICTIVE ROUTING

CROSS-REFERENCE TO RELATED APPLICATIONS

This application claims priority to and the benefit of U.S. Provisional Application No. 63/433,538, titled "Systems and Methods Relating to Estimating Relative Gain in Target Metrics of Contact Centers," filed on Dec. 19, 2022, the contents of which are incorporated herein by reference in their entirety.

BACKGROUND

Call centers and other contact centers are used by many organizations to provide technical and other support to their end users. The end user may interact with human and/or virtual agents of the contact center by establishing electronic communications via one or more communication technologies including, for example, telephone, email, web chat, Short Message Service (SMS), dedicated software application(s), and/or other technologies. Contact centers may have a substantial number of agents in order to efficiently respond to end user queries and, therefore, contact centers use some mechanism to route communications or interactions to an appropriate agent.

SUMMARY

One embodiment is directed to a unique system, components, and methods for leveraging relative gain in predictive routing of interactions to contact center agents. Other embodiments are directed to apparatuses, systems, devices, hardware, methods, and combinations thereof for leveraging relative gain in predictive routing of interactions to contact center agents.

According to an embodiment, a method of leveraging relative gain in predictive routing of interactions to contact center agents may include identifying an interaction to be routed to a contact center agent, determining a predictive routing score for each prospective contact center agent of a plurality of prospective contact center agents to which the interaction can be routed based on a historical performance of each prospective contact center agent, determining a relative gain for each prospective contact center agent based on an interaction class of the interaction, an agent class performance of the prospective contact center agent, and an agent value of the prospective contact center agent, wherein the relative gain of a respective contact center agent is indicative of a relative optimization improvement of routing the interaction to the respective contact center agent relative to another of the prospective contact center agents, ranking the prospective contact center agents based on the associated predictive routing score and the associated relative gain for each prospective contact center agent, selecting the contact center agent of the prospective contact center agents based on the ranking of the prospective contact center agents, and routing the interaction to the selected contact center agent.

In some embodiments, the historical performance of each prospective contact center agent may be associated with a historical performance of the respective prospective contact center agent with handling interactions of the interaction class.

In some embodiments, the method may further include ranking the prospective contact center agents based on the associated predictive routing score for each prospective contact center agent to determine a first agent ranking, and ranking the prospective contact center agents based on the associated predictive routing score and the associated relative gain for each prospective contact center agent may include re-ranking the first agent ranking based on the associated relative gain for each prospective contact center agent to determine a second agent ranking, and selecting the contact center agent of the prospective contact center agents based on the ranking may include selecting the contact center agent of the prospective contact center agents based on the second agent ranking.

In some embodiments, determining the relative gain for each prospective contact center agent based on the interaction class of the interaction may include determining the relative gain for each prospective contact center agent based on a class value associated with the interaction class.

In some embodiments, the method may further include determining the interaction class of the interaction in response to identifying the interaction to be routed to the contact center agent.

In some embodiments, the interaction class may be selected from a plurality of interaction classes predefined by an administrator.

In some embodiments, the plurality of interaction classes may be defined by machine learning.

In some embodiments, the method may further include identifying a prospective interaction class, determining an average handle time and an agent performance rank of each contact center agent for the identified prospective interaction class based on historical performance data of each contact center agent, determining whether relative gain criteria are satisfied based on the average handle time and the agent performance rank of each contact center agent for the identified prospective interaction class, and defining the prospective interaction class as an interaction class for relative gain analysis in response to determining that the relative gain criteria are satisfied.

In some embodiments, determining whether the relative gain criteria are satisfied may include determining an agent performance rank variance metric from the agent performance rank of each contact center agent for the identified prospective interaction class, and determining an average handle time variance metric from the average handle time of each contact center agent for the identified prospective interaction class.

In some embodiments, the relative gain criteria may be satisfied in response to a determination that the agent performance rank variance metric exceeds a first threshold and the average handle time variance metric is less than a second threshold.

In some embodiments, each of the agent performance variance metric and the average handle time variance metric may be a coefficient of variation.

According to another embodiment, a system for leveraging relative gain in predictive routing of interactions to contact center agents may include at least one processor and at least one memory comprising a plurality of instructions stored therein that, in response to execution by the at least one processor, causes the system to identify an interaction to be routed to a contact center agent, determine a predictive routing score for each prospective contact center agent of a plurality of prospective contact center agents to which the interaction can be routed based on a historical performance of each prospective contact center agent, determine a relative gain for each prospective contact center agent based on an interaction class of the interaction, an agent class performance of the prospective contact center agent, and an agent value of the prospective contact center agent, wherein the relative gain of a respective contact center agent is indicative of a relative optimization improvement of routing the interaction to the respective contact center agent relative to another of the prospective contact center agents, rank the prospective contact center agents based on the associated predictive routing score and the associated relative gain for each prospective contact center agent, select the contact center agent of the prospective contact center agents based on the ranking of the prospective contact center agents, and route the interaction to the selected contact center agent.

In some embodiments, the historical performance of each prospective contact center agent may be associated with a historical performance of the respective prospective contact center agent with handling interactions of the interaction class.

In some embodiments, the plurality of instructions may further cause the system to rank the prospective contact center agents based on the associated predictive routing score for each prospective contact center agent to determine a first agent ranking, to rank the prospective contact center agents based on the associated predictive routing score and the associated relative gain for each prospective contact center agent may include to re-rank the first agent ranking based on the associated relative gain for each prospective contact center agent to determine a second agent ranking, and to select the contact center agent of the prospective contact center agents based on the ranking may include to select the contact center agent of the prospective contact center agents based on the second agent ranking.

In some embodiments, to determine the relative gain for each prospective contact center agent based on the interaction class of the interaction may include to determine the relative gain for each prospective contact center agent based on a class value associated with the interaction class.

In some embodiments, the plurality of instructions may further cause the system to determine the interaction class of the interaction in response to identifying the interaction to be routed to the contact center agent.

In some embodiments, the interaction class may be selected from a plurality of interaction classes predefined by an administrator.

In some embodiments, the plurality of instructions may further cause the system to identify a prospective interaction class, determine an average handle time and an agent performance rank of each contact center agent for the identified prospective interaction class based on historical performance data of each contact center agent, determine whether relative gain criteria are satisfied based on the average handle time and the agent performance rank of each contact center agent for the identified prospective interaction class, and define the prospective interaction class as an interaction class for relative gain analysis in response to determining that the relative gain criteria are satisfied.

In some embodiments, to determine whether the relative gain criteria are satisfied may include to determine an agent performance rank variance metric from the agent performance rank of each contact center agent for the identified prospective interaction class, and to determine an average handle time variance metric from the average handle time of each contact center agent for the identified prospective interaction class.

In some embodiments, the relative gain criteria may be satisfied in response to a determination that the agent performance rank variance metric exceeds a first threshold and the average handle time variance metric is less than a second threshold.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
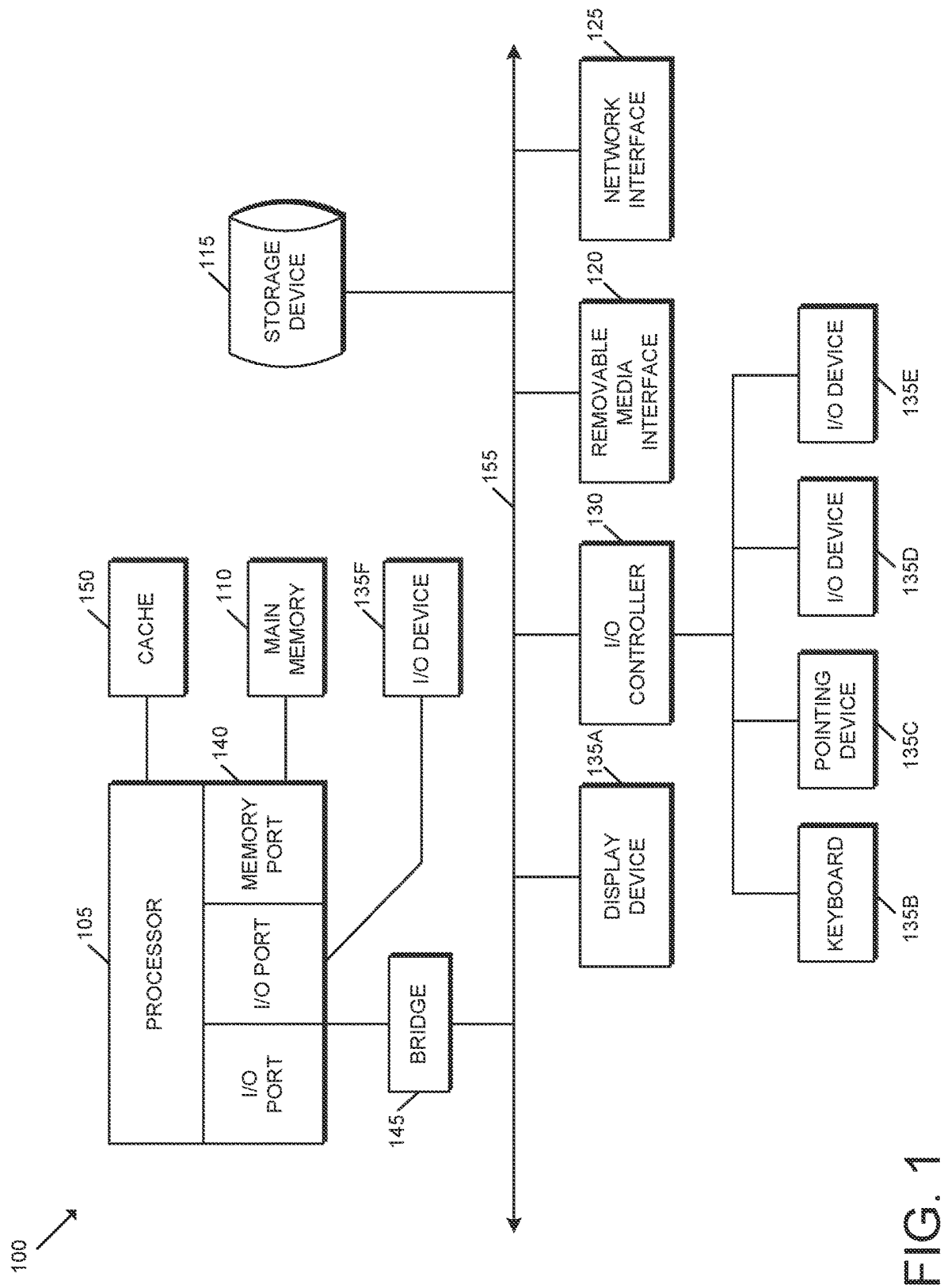
FIG. 1 is a simplified block diagram of at least one embodiment of a computing device.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Further, particular features, structures, or characteristics may be combined in any suitable combinations and/or sub-combinations in various embodiments.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, a simplified block diagram of at least one embodiment of a computing device 100 is shown. The illustrative computing device 100 depicts at least one embodiment of each of the computing devices, systems, servicers, controllers, switches, gateways, engines, modules, and/or computing components described herein (e.g., which collectively may be referred to interchangeably as computing devices, servers, or modules for brevity of the description). For example, the servers may be a process or thread running on one or more processors of one or more computing devices 100, which may be executing computer program instructions and interacting with other system modules in order to perform the various functionalities described herein.

Unless otherwise specifically limited, the functionality described in relation to a plurality of computing devices may be integrated into a single computing device, or the various functionalities described in relation to a single computing device may be distributed across several computing devices. Further, in relation to the computing systems described herein—such as the contact center system 200 of FIG. 2—the various servers and computing devices thereof may be located on local computing devices 100 (e.g., on-site at the same physical location as the agents of the contact center), remote computing devices 100 (e.g., off-site or in a cloud-based or cloud computing environment, for example, in a remote data center connected via a network), or some combination thereof. In some embodiments, functionality provided by servers located on computing devices off-site may be accessed and provided over a virtual private network (VPN), as if such servers were on-site, or the functionality may be provided using a software as a service (SaaS) accessed over the Internet using various protocols, such as by exchanging data via extensible markup language (XML), JSON, and/or the functionality may be otherwise accessed/leveraged.

As shown in the illustrated example, the computing device 100 may include a central processing unit (CPU) or processor 105 and a main memory 110. The computing device 100 may also include a storage device 115, a removable media interface 120, a network interface 125, an input/output (I/O) controller 130, and one or more input/output (I/O) devices 135. For example, as depicted, the I/O devices 135 may include a display device 135A, a keyboard 135B, and/or a pointing device 135C. The computing device 100 may further include additional elements, such as a memory port 140, a bridge 145, one or more I/O ports, one or more additional input/output (I/O) devices 135D, 135E, 135F, and/or a cache memory 150 in communication with the processor 105.

The processor 105 may be any logic circuitry that responds to and processes instructions fetched from the main memory 110. For example, the processor 105 may be implemented by an integrated circuit (e.g., a microprocessor, microcontroller, or graphics processing unit), or in a field-programmable gate array (FPGA) or application-specific integrated circuit (ASIC). As depicted, the processor 105 may communicate directly with the cache memory 150 via a secondary bus or backside bus. It should be appreciated that the cache memory 150 typically has a faster response time than the main memory 110. The main memory 110 may be one or more memory chips capable of storing data and allowing stored data to be directly accessed by the processor 105. The storage device 115 may provide storage for an operating system, which controls scheduling tasks and access to system resources, and other software. Unless otherwise limited, the computing device 100 may include an operating system and software capable of performing the functionality described herein.

As depicted in the illustrated example, the computing device 100 may include a wide variety of I/O devices 135, one or more of which may be connected via the I/O controller 130. Input devices may include, for example, a keyboard 135B and a pointing device 135C (e.g., a mouse or optical pen). Output devices may include, for example, video display devices, speakers, and printers. The I/O devices 135 and/or the I/O controller 130 may include suitable hardware and/or software for enabling the use of multiple display devices. The computing device 100 may also support one or more removable media interfaces 120, such as a disk drive, USB port, or any other device suitable for reading data from or writing data to computer readable media. More generally, the I/O devices 135 may include any conventional devices for performing the functionality described herein.

The computing device 100 may be any workstation, desktop computer, laptop or notebook computer, server machine, virtualized machine, mobile or smart phone, portable telecommunication device, media playing device, gaming system, mobile computing device, or any other type of computing, telecommunications or media device, without limitation, capable of performing the operations and functionality described herein. Although described in the singular for clarity and brevity of the description, the computing device 100 may include a plurality of devices connected by a network or connected to other systems and resources via a network. As used herein, a network may be embodied as or include one or more computing devices, machines, clients, client nodes, client machines, client computers, client devices, endpoints, or endpoint nodes in communication with one or more other computing devices, machines, clients, client nodes, client machines, client computers, client devices, endpoints, or endpoint nodes. For example, the network may be embodied as or include a private or public switched telephone network (PSTN), wireless carrier network, local area network (LAN), private wide area network (WAN), public WAN such as the Internet, etc., with connections being established using appropriate communication protocols. More generally, it should be understood that, unless otherwise limited, the computing device 100 may communicate with other computing devices 100 via any type of network using any suitable communication protocol. Further, the network may be a virtual network environment where various network components are virtualized. For example, the various machines may be virtual machines implemented as a software-based computer running on a physical machine, or a "hypervisor" type of virtualization may be used where multiple virtual machines run on the same host physical machine. Other types of virtualization may be employed in other embodiments.

Figure 2:
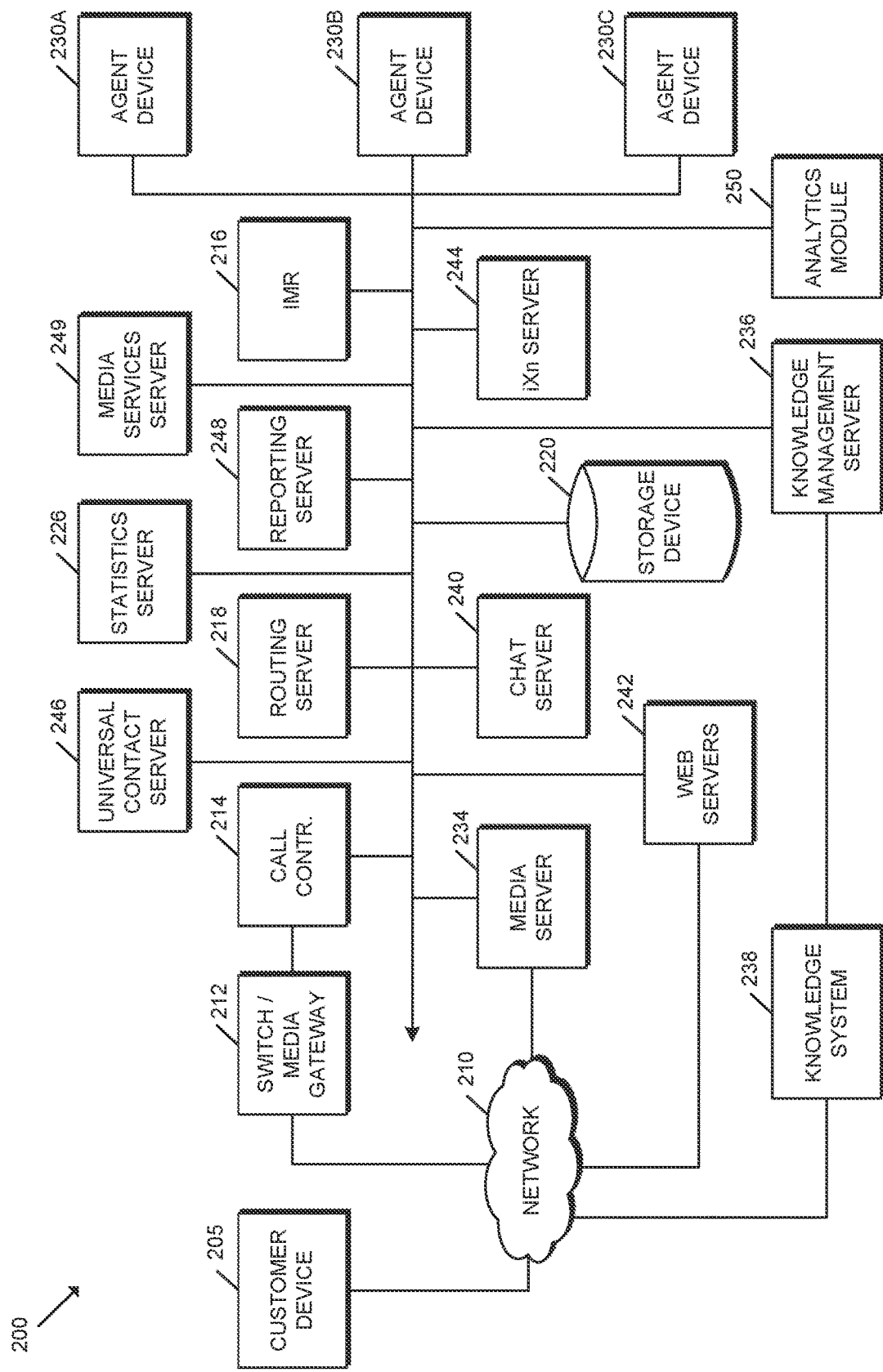
FIG. 2 is a simplified block diagram of at least one embodiment of a contact center system and/or communications infrastructure.

Referring now to FIG. 2, a simplified block diagram of at least one embodiment of a communications infrastructure and/or content center system, which may be used in conjunction with one or more of the embodiments described herein, is shown. The contact center system 200 may be embodied as any system capable of providing contact center services (e.g., call center services, chat center services, SMS center services, etc.) to an end user and otherwise performing the functions described herein. The illustrative contact center system 200 includes a customer device 205, a network 210, a switch/media gateway 212, a call controller 214, an interactive media response (IMR) server 216, a routing server 218, a storage device 220, a statistics server 226, agent devices 230A, 230B, 230C, a media server 234, a knowledge management server 236, a knowledge system 238, chat server 240, web servers 242, an interaction (iXn) server 244, a universal contact server 246, a reporting server 248, a media services server 249, and an analytics module 250. Although only one customer device 205, one network 210, one switch/media gateway 212, one call controller 214, one IMR server 216, one routing server 218, one storage device 220, one statistics server 226, one media server 234, one knowledge management server 236, one knowledge system 238, one chat server 240, one iXn server 244, one universal contact server 246, one reporting server 248, one media services server 249, and one analytics module 250 are shown in the illustrative embodiment of FIG. 2, the contact center system 200 may include multiple customer devices 205, networks 210, switch/media gateways 212, call controllers 214, IMR servers 216, routing servers 218, storage devices 220, statistics servers 226, media servers 234, knowledge management servers 236, knowledge systems 238, chat servers 240, iXn servers 244, universal contact servers 246, reporting servers 248, media services servers 249, and/or analytics modules 250 in other embodiments. Further, in some embodiments, one or more of the components described herein may be excluded from the system 200, one or more of the components described as being independent may form a portion of another component, and/or one or more of the components described as forming a portion of another component may be independent.

It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider providing customer services through the contact center system 200), as well as the organization or enterprise on behalf of which those customer services are being provided.

By way of background, customer service providers may offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, and/or other communication channels.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chatbots", and/or other automated processed. In many cases, this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

It should be appreciated that the contact center system 200 may be used by a customer service provider to provide various types of services to customers. For example, the contact center system 200 may be used to engage and manage interactions in which automated processes (or bots) or human agents communicate with customers. As should be understood, the contact center system 200 may be an in-house facility to a business or enterprise for performing the functions of sales and customer service relative to products and services available through the enterprise. In another embodiment, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment with infrastructure for supporting multiple contact centers for multiple enterprises. The contact center system 200 may include software applications or programs, which may be executed on premises or remotely or some combination thereof. It should further be appreciated that the various components of the contact center system 200 may be distributed across various geographic locations and not necessarily contained in a single location or computing environment.

It should further be understood that, unless otherwise specifically limited, any of the computing elements of the technologies described herein may be implemented in cloud-based or cloud computing environments. As used herein and further described in reference to the computing device 100, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture," a cloud execution model generally includes a service provider dynamically managing an allocation and provisioning of remote servers for achieving a desired functionality.

It should be understood that any of the computer-implemented components, modules, or servers described in relation to FIG. 2 may be implemented via one or more types of computing devices, such as, for example, the computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and/or other characteristics.

Customers desiring to receive services from the contact center system 200 may initiate inbound communications (e.g., telephone calls, emails, chats, etc.) to the contact center system 200 via a customer device 205. While FIG. 2 shows one such customer device—i.e., customer device 205—it should be understood that any number of customer devices 205 may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, web-browsing sessions, and other multi-media transactions.

Inbound and outbound communications from and to the customer devices 205 may traverse the network 210, with the nature of the network typically depending on the type of customer device being used and the form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access (CDMA) network, global system for mobile communications (GSM) network, or any wireless network/technology conventional in the art, including but not limited to 3G, 4G, LTE, 5G, etc.

The switch/media gateway 212 may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 212 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230.

As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VOIP calls, and/or other types of calls. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

The interactive media response (IMR) server 216 may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may instruct customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource. The IMR configuration may be performed through the use of a self-service and/or assisted service tool which comprises a web-based tool for developing IVR applications and routing applications running in the contact center environment (e.g. Genesys® Designer).

The routing server 218 may function to route incoming interactions. For example, once it is determined that an inbound communication should be handled by a human agent, functionality within the routing server 218 may select the most appropriate agent and route the communication thereto. This agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described herein, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent is able to provide to the customer.

It should be appreciated that the contact center system 200 may include one or more mass storage devices—represented generally by the storage device 220—for storing data in one or more databases relevant to the functioning of the contact center. For example, the storage device 220 may store customer data that is maintained in a customer database. Such customer data may include, for example, customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database. Agent data maintained by the contact center system 200 may include, for example, agent availability and agent profiles, schedules, skills, handle time, and/or other relevant data. As another example, the storage device 220 may store interaction data in an interaction database. Interaction data may include, for example, data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therein or transmit data thereto for storage. The storage device 220, for example, may take the form of any conventional storage medium and may be locally housed or operated from a remote location. As an example, the databases may be Cassandra database, NoSQL database, or a SQL database and managed by a database management system, such as, Oracle, IBM DB2, Microsoft SQL server, or Microsoft Access, PostgreSQL.

The statistics server 226 may be configured to record and aggregate data relating to the performance and operational aspects of the contact center system 200. Such information may be compiled by the statistics server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center system 200 may be communication devices configured to interact with the various components and modules of the contact center system 200 in ways that facilitate functionality described herein. An agent device 230, for example, may include a telephone adapted for regular telephone calls or VOIP calls. An agent device 230 may further include a computing device configured to communicate with the servers of the contact center system 200, perform data processing associated with operations, and interface with customers via voice, chat, email, and other multimedia communication mechanisms according to functionality described herein. Although FIG. 2 shows three such agent devices 230—i.e., agent devices 230A, 230B and 230C—it should be understood that any number of agent devices 230 may be present in a particular embodiment.

The multimedia/social media server 234 may be configured to facilitate media interactions (other than voice) with the customer devices 205 and/or the servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

The knowledge management server 236 may be configured to facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials. As an example, the knowledge system 238 may be embodied as IBM Watson or a similar system.

The chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage, and facilitate user interfaces (UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 236 and the knowledge systems 238 for receiving suggestions and answers to queries posed by customers during a chat so that, for example, links to relevant articles can be provided.

The web servers 242 may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

The interaction (iXn) server 244 may be configured to manage deferrable activities of the contact center and the routing thereof to human agents for completion. As used herein, deferrable activities may include back-office work that can be performed off-line, e.g., responding to emails, attending training, and other activities that do not entail real-time communication with a customer. As an example, the interaction (iXn) server 244 may be configured to interact with the routing server 218 for selecting an appropriate agent to handle each of the deferrable activities. Once assigned to a particular agent, the deferrable activity is pushed to that agent so that it appears on the agent device 230 of the selected agent. The deferrable activity may appear in a workbin as a task for the selected agent to complete. The functionality of the workbin may be implemented via any conventional data structure, such as, for example, a linked list, array, and/or other suitable data structure. Each of the agent devices 230 may include a workbin. As an example, a workbin may be maintained in the buffer memory of the corresponding agent device 230.

The universal contact server (UCS) 246 may be configured to retrieve information stored in the customer database and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

The reporting server 248 may be configured to generate reports from data compiled and aggregated by the statistics server 226 or other sources. Such reports may include near real-time reports or historical reports and concern the state of contact center resources and performance characteristics, such as, for example, average wait time, abandonment rate, and/or agent occupancy. The reports may be generated automatically or in response to specific requests from a requestor (e.g., agent, administrator, contact center application, etc.). The reports then may be used toward managing the contact center operations in accordance with functionality described herein.

The media services server 249 may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and/or other relevant features.

The analytics module 250 may be configured to provide systems and methods for performing analytics on data received from a plurality of different data sources as functionality described herein may require. In accordance with example embodiments, the analytics module 250 also may generate, update, train, and modify predictors or models based on collected data, such as, for example, customer data, agent data, and interaction data. The models may include behavior models of customers or agents. The behavior models may be used to predict behaviors of, for example, customers or agents, in a variety of situations, thereby allowing embodiments of the technologies described herein to tailor interactions based on such predictions or to allocate resources in preparation for predicted characteristics of future interactions, thereby improving overall contact center performance and the customer experience. It will be appreciated that, while the analytics module is described as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database and agent database. The analytics module 250 also may have access to the interaction database, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, the analytic module 250 may be configured to retrieve data stored within the storage device 220 for use in developing and training machine learning algorithms and models, for example, by applying machine learning techniques.

One or more of the included models may be configured to predict customer or agent behavior and/or aspects related to contact center operation and performance. Further, one or more of the models may be used in natural language processing and, for example, include intent recognition and the like. The models may be developed based upon known first principle equations describing a system; data, resulting in an empirical model; or a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, in some embodiments, it may be preferable that the models are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach may be a preferred embodiment for implementing the models. Neural networks, for example, may be developed based upon empirical data using advanced regression algorithms.

The analytics module 250 may further include an optimizer. As will be appreciated, an optimizer may be used to minimize a "cost function" subject to a set of constraints, where the cost function is a mathematical representation of desired objectives or system operation. Because the models may be non-linear, the optimizer may be a nonlinear programming optimizer. It is contemplated, however, that the technologies described herein may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like.

According to some embodiments, the models and the optimizer may together be used within an optimization system. For example, the analytics module 250 may utilize the optimization system as part of an optimization process by which aspects of contact center performance and operation are optimized or, at least, enhanced. This, for example, may include features related to the customer experience, agent experience, interaction routing, natural language processing, intent recognition, or other functionality related to automated processes.

The various components, modules, and/or servers of FIG. 2 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers in various embodiments. Further, the terms "interaction" and "communication" are used interchangeably, and generally refer to any real-time and non-real-time interaction that uses any communication channel including, without limitation, telephone calls (PSTN or VOIP calls), emails, vmails, video, chat, screen-sharing, text messages, social media messages, WebRTC calls, etc. Access to and control of the components of the contact system 200 may be affected through user interfaces (UIs) which may be generated on the customer devices 205 and/or the agent devices 230. As already noted, the contact center system 200 may operate as a hybrid system in which some or all components are hosted remotely, such as in a cloud-based or cloud computing environment. It should be appreciated that each of the devices of the call center system 200 may be embodied as, include, or form a portion of one or more computing devices similar to the computing device 100 described in reference to FIG. 1.

Figure 3:
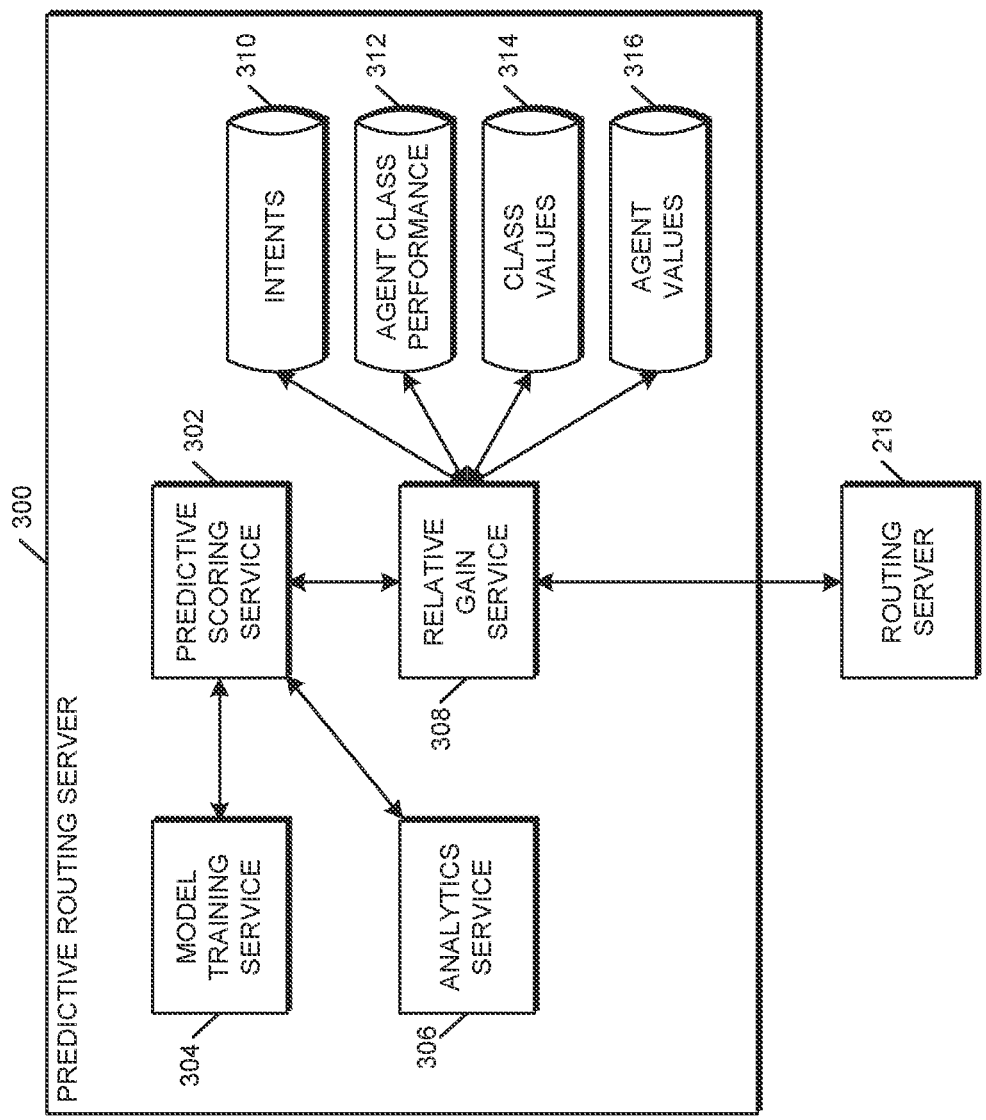
FIG. 3 is a simplified block diagram of at least one embodiment of a predictive routing server.

Referring now to FIG. 3, a predictive routing server 300 may operate as part of the contact center system (e.g., the contact center system 200 of FIG. 2). As shown, the illustrative predictive routing server 300 includes a predictive scoring service 302, a model training service 304, an analytics server 306, and a relative gain service 308. Additionally, the illustrative predictive routing service 300 may include an intents data store 310, an agent class performance data store 312, a class values data store 314, and an agent values data store 316. It should be appreciated that each of the data stores 310, 312, 314, 316 may be embodied as a database and/or other suitable data structure suitable for storing the corresponding data. Further, in some embodiments, one or more of the data stores 310, 312, 314, 316 may be combined. In some embodiments, one or more of the data stores 310, 312, 314, 316 and/or other data stores may store additional data relevant to defining interaction classes, relative gain analysis, and/or other functions described herein. For example, in some embodiments, client attributes (e.g., client contract type, etc.), agent attributes (e.g., agent tenure in the contact center, etc.), interaction context (e.g., interaction time of arrival to the contact center, etc.), and/or other data may be stored. It should also be appreciated that, although the predictive routing server 300 is described herein as being a discrete device, it should be appreciated that the predictive routing server 300 may form a portion of one or more other devices of the contact center system 200 (or other system) in other embodiments, for example, such that the functions of the predictive routing server 300 described herein are performed by one or more other entities of the contact center system 200 (or other system).

The predictive routing server 300 may be communicatively coupled with the routing server 218 of the contact center system 200, and may be configured to use historical and real-time data, along with artificial intelligence, to identify factors that influence customer-to-business interactions. These data may include, for example, favored communication channel, past product purchases and service requests, and recent transaction activity. The predictive routing server 300 may combine this information with agent profiles and factors (e.g., agent skills, interaction history, and business outcome data) to predict ideal customer-agent matches. The predictive routing server 300 may include a core machine learning server that is capable of performing a number of functions, as described herein.

The predictive routing server 300 may permit inputs of customer profile data, agent profile data, interaction data, and outcome data associated with the interaction data. The inputs may be obtained from a storage device 220, a configuration server, or other appropriate hardware for maintaining the data. The predictive routing server 300 may be configured to perform batch processing to run a number of analytical processes, such as variance analysis and feature analysis, on historical data. A variance analysis performed by the predictive routing server 300 may provide analysis on how a selected target metric may vary across different agent populations. A variance analysis may be generated for inter-agent variance, which may show how well individual agents perform, including an identification of the highest-performing and weakest agents. A variance analysis may also be generated for agent variance, which may show the range of agent performance for each category as specified group of agents. Examples of a grouping of agents could include, for example, an agent's role and an agent's skills. A feature analysis performed by the predictive routing server 300 may be configured to generate predictors and models for the predictive routing server 300. In particular, generated predictors and models enables the contact center operator to determine which factors have the most impact on a selected target metric. Examples of factors that determine the impact on a selected target metric may include agent characteristics and agent behavior, customer characteristics, behavior, and other factors.

The predictive routing server 300 may be configured to train predictive models for real-time scoring use. In other words, a generated predictive model may be used to determine the routing of incoming interaction to an available agent. The predictive model used by the predictive routing server 300 may generate (e.g., upon receipt of an interaction by the routing server 218) a real-time list of agents that are available to handle the interaction, which are scored against the model. The interaction may then be routed to one of the available agents based on the scoring of the model. Additionally, the predictive routing server 300 may store predicted and actual outcomes of agent-customer interactions and generate reports and dashboards tracking performance of models for target metrics.

The predictive scoring service 302 may be configured to receive a model trained on the predictive routing server 300. The received trained model can be available on the predictive scoring service 302 as a worker to take scoring requests that may come from other systems of the contact center system 200. In some embodiments, the predictive routing server 300 may have multiple workers of the predictive scoring service 302 to score requests for a number of target metrics. In some embodiments, dedicated instances of the predictive scoring service 302 may be provided for each provided scoring service of the predictive routing server 300. It should be appreciated that the predictive scoring service 302 may rank the contact center agents based on their historical performance based, for example, one or more key performance indicators (KPIs) (i.e., a measurable value for performance over a specific goal).

The model training service 304 may be configured as a dedicated service to analyze received data and train models for the predictive routing server 300. The model training service 304 may be configured to train a model by transforming historical data, generating new features, aggregating outcomes, running feature analysis, and training and testing for regression and classification models. The model training service 304 may be configured to utilize machine learning algorithms to train models. Machine learning algorithms deployed by the model training server 304 may vary depending on the particular embodiment. For example, in some embodiments, the model training service 304 may utilize one or more neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, rule-based algorithms, ensemble algorithms, artificial intelligence, and/or other suitable machine learning algorithms, artificial intelligence algorithms, techniques, and/or mechanisms.

The analytics service 306 may be configured to perform analysis on different datasets to help guide configuration of usable datasets and target metrics to optimize datasets to consume for model training. The analytics service 306 may perform aggregation on datasets as part of the scoring service worker. In an embodiment, the analytics service 306 may include dedicated processes to run feature analysis, variance analysis, simulations, lift estimation, and/or other analytics.

The relative gain service 308 may be configured to determine the relative gain for each contact center agent with respect to a particular interaction class, as described in greater detail below. That is, the relative gain service 308 may determine, for each of the contact center agents being assessed, the relative optimization improvement of routing the interaction to the agent instead of other contact center agents based, for example, on the interaction class, intent context, agent performance in handling interactions within the relevant interaction class and/or with the associated intent context, a class value associated with the interaction class (e.g., the estimated cost or value of the interaction), an agent value associated with the particular agent (e.g., the skill level or per-unit value/rate of the agent), and/or other parameters. It should be appreciated that the relative gain service 308 may retrieve relevant data from the data stores 310, 312, 314, 316 in order to perform the relative gain analysis. As described below, the relative gain service 308 may re-rank the agent ranking provided by the predictive scoring service 302 (e.g., based only on KPI-based optimization) to incorporate the relative gain of the agents. It should be appreciated that, in some embodiments, the relative gain analysis is only performed when there is an interaction surplus and/or a significant likelihood that a more complex interaction and/or interaction otherwise better suited to be handled by a high level agent is likely to be incoming.

It should be appreciated that traditional routing optimization aims to rank agents for interactions according to the agents' historical performance on a given key performance indicator (KPI). This approach generally results in recurrently placing the "best" (i.e., highest performing) agents at the top of the ranking and attempting to route incoming interactions to the best agents first. This ensures the optimization (minimization or maximization) of a given KPI relevant to the contact center. However, such an approach fails to consider other factors such as the potential gain/cost of assigning an inbound interaction to an agent beyond the KPI optimization. For example, although an agent could be the best performing in several areas, it may not be most efficient holistically to assign such a high performing agent to low-valued and/or low-complexity interactions, which could be similarly handled by an average or even low performing agent.

The increasing adoption of analytics in contact centers has spurred the need for capturing more interaction metadata, opening new doors for improving routing strategies based on the interaction context, customer attributes, and agent attributes. Such information provides means for categorizing or classifying interactions that have properties in common. For example, a class of interactions may be defined for a group of clients who want to purchase something.

The technologies described herein allow for the refers to the idea of withholding agent assignments that would traditionally be assigned to interactions (e.g., based on KPI rank) when the agent's performance is above the requirements to fulfill the interaction successfully, without abandoning the overall KPI optimization. For example, in one embodiment, an interaction with the intent (interaction context) of "password change" may be handled by any available agent (e.g., even newly hired agents with minimal training), and therefore, the system may refrain from assigning such interactions to highly skilled or higher paid agents, who could be reserved for handling other expected interactions with a potentially higher return. By withholding agents for higher valued interactions, there may be an underlying assumption that new "more complex" interactions would arrive at the contact center to be handled by the withheld agents. In various embodiments, the technologies described herein may leverage machine learning and/or statistical approaches during predictive routing optimization on contact center queues to implement the relative gain features.

Incoming (inbound) interactions in a contact center may be processed first by an interactive voice response (IVR) system that extracts the intent of customers and defines the flow that an interaction should follow based on the information gathered. When an interaction needs to be routed to a contact center agent, an automatic call distribution (ACD) may perform the routing using various routing strategies. One of those routing strategies is known as predictive routing, which aims to route interactions to agents that will help to optimize a target KPI selected by the contact center administrator. Given an inbound interaction, predictive routing may use machine learning models to predict the KPI performance of each available agent, ranking them according to a scoring function. The technologies described herein adjust the scoring function (or modify the final results) to weight in the relative gain of assigning an agent to an interaction. To do so, in some embodiments, the system may, for example, compute and store a table with statistics related to the complexity/value of each interaction class, periodically generate or update a table with the agents' performance for each interaction class, periodically generate or update a table with statistics for each interaction class, maintain a table including a measurable value associated with each agent (e.g., cost per unit of time), and update the agents' predictive routing scores according to relative gain rules for each interaction class. Additionally, historical performance may be calculated at the agent level for each interaction class based on past successfully routed interactions and stored for consumption during future routing decisions. Data such as the class value, agent values, and/or other values may be provided by contact center administrators, inferred based on context, determined from machine learning, and/or otherwise determined based on the particular embodiment.

It should be appreciated that interactions belonging to the same group based on various criteria may be defined as an interaction class as described herein. For example, all interactions with the same intent and/or other shared contextual information may be defined as a particular interaction class. By way of example, in an embodiment, the system may define one interaction class as having the intent of "password change" with the client contract type of "standard," another interaction class as having the intent of "password change" with the client contract type of "premium," another interaction class as having the intent of "sales-business" with a client tenures of "two years" and the day of month being "28," and yet another interaction class as having the intent of "tech support" with an associated problem of "API error." In other words, the interaction classes aim to group interactions that share something in common. In some embodiments, the interaction classes may be defined by a system administrator. However, in other embodiments, the interaction classes may be inferred from historical data (e.g., using machine learning). In embodiments in which interaction classes are not provided by the contact center system administrator, the interaction classes may be inferred based on historical data, for example using unsupervised machine learning technologies. For example, in some embodiments, the system may utilize a two-dimensional analysis (e.g., using agent rank variance and interaction average handle time variance) similar to that described below in reference to FIG. 4. In other embodiments, other KPIs and/or parameters and/or different machine learning technologies may be used to define the interaction classes.

Figure 4:
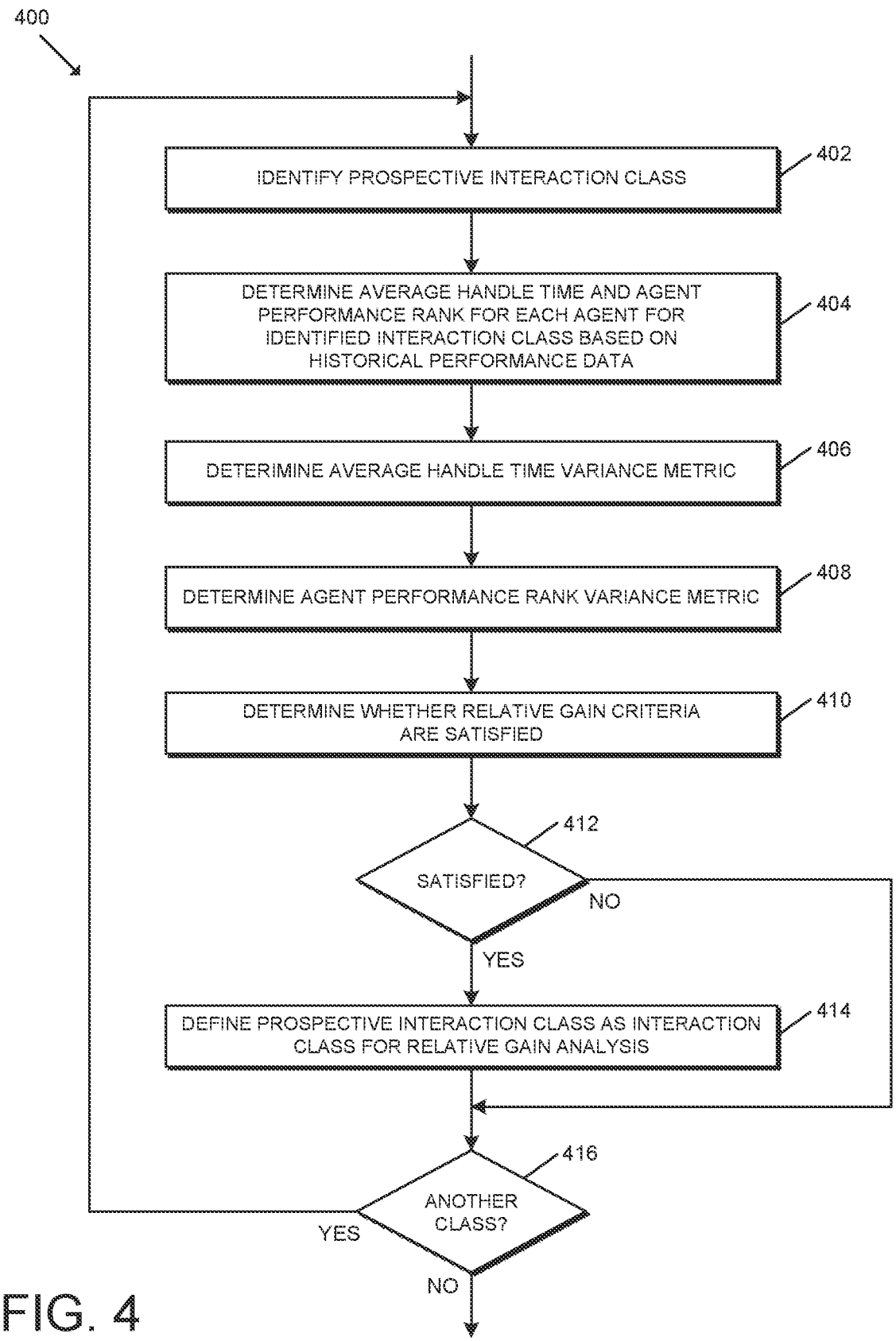
FIG. 4 is a simplified block diagram of at least one embodiment of a method of defining interaction classes for relative gain.

Referring now to FIG. 4, in use, a computing system (e.g., the computing device 100, the contact center system 200, the predictive routing server 300, and/or other computing devices described herein) may execute a method 400 for defining interaction classes for relative gain. It should be appreciated that the particular blocks of the method 400 are illustrated by way of example, and such blocks may be combined or divided, added or removed, and/or reordered in whole or in part depending on the particular embodiment, unless stated to the contrary.

The illustrative method 400 begins with block 402 in which the system identifies a prospective interaction class. In other words, the system selects the intent, contextual information, and/or other criteria to analyze as a potential interaction class and, more specifically, to determine whether the prospective interaction class satisfies predefined relative gain criteria, thereby making it eligible for relative gain analysis. It should be appreciated that the system may identify or select a prospective interaction class for analysis using any suitable technique and/or algorithm. It should be further appreciated that an interaction class eligible for relative gain analysis is one for which it is appropriate to determine whether a KPI-based routing decision should be overridden because the assignment of a particular agent is not beneficial (e.g., assigning a phone number update interaction to the best performing has a low benefit, and therefore low relative gain).

In block 404, the system determines the average handle time (AHT) and agent performance rank for each contact center agent for the identified prospective interaction class based on historical performance data. In block 406, the system determines an AHT variance metric from the average handle time of each contact center agent for the identified prospective interaction class, and in block 408, the system determines an agent performance rank variance metric from the agent performance rank of each contact center agent for the identified prospective interaction class. It should be appreciated that each of the AHT variance metric and the agent performance rank variance metric may be any metric that is suitable for describing the variation in the data and otherwise consistent with the functions described herein. For example, in some embodiments, each of the AHT variance metric and the agent performance rank variance metric is a standard variance, whereas in other embodiments, each of the AHT variance metric and the agent performance rank variance metric is a coefficient of variation.

Figure 5:
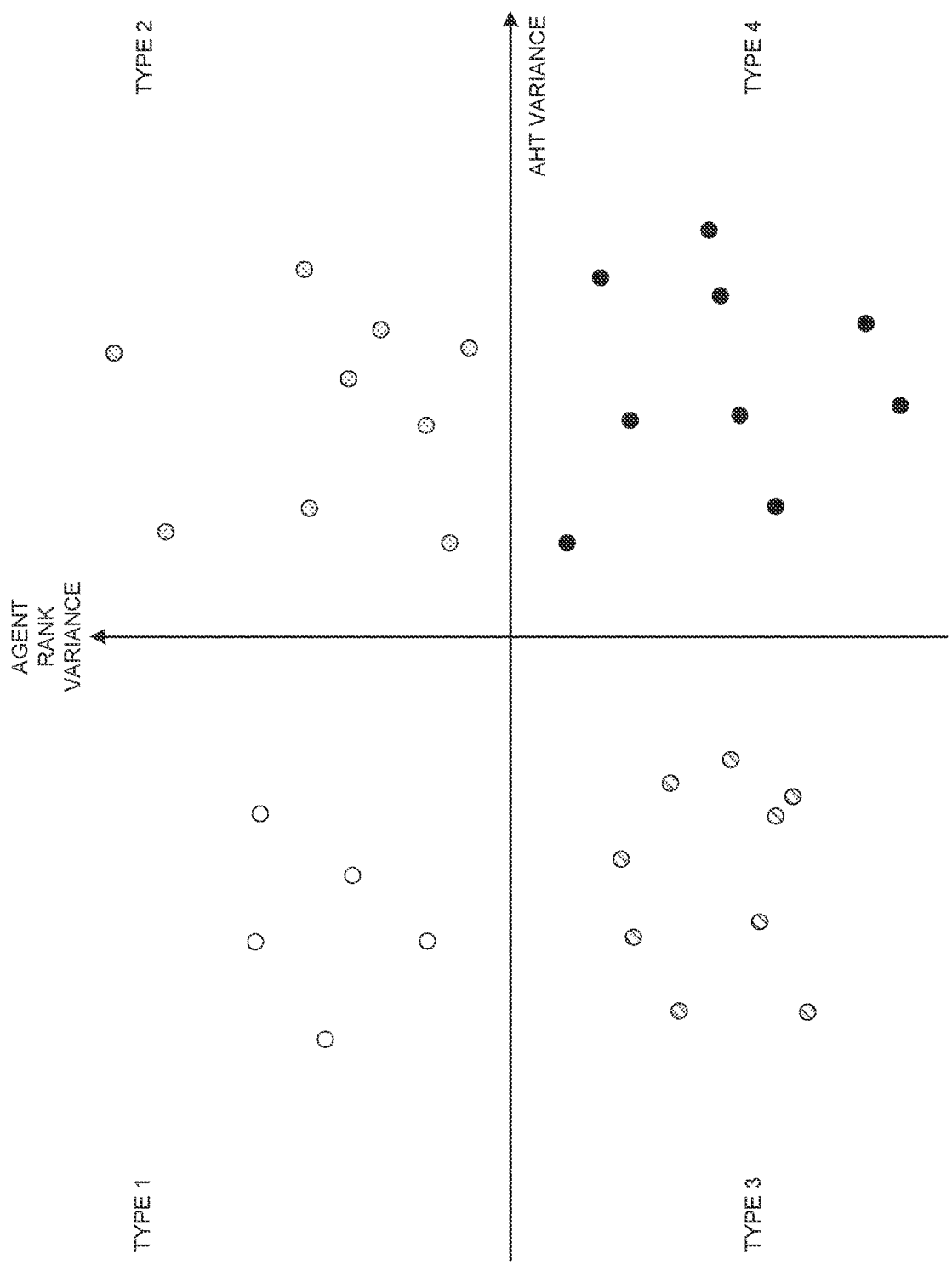
FIG. 5 is an exemplary graph of prospective interaction classes.

In block 410, the system determines whether one or more relative gain criteria are satisfied. For example, in some embodiments, the relative gain criteria may include a requirement that the agent performance variance metric exceeds a first predefined threshold value and that the AHT variance metric fall below a second predefined threshold value. For example, FIG. 5 depicts an exemplary graph that plots the AHT variance and agent rank variance for each prospective interaction class, with AHT variance as the abscissa and agent rank variance as the ordinate. It should be appreciated that the various results may be distinguished by quadrant as four different types. A first type of interaction class (Type 1) includes prospective interaction classes having a high agent rank variance and a low AHT variance. A second type of interaction class (Type 2) includes prospective interaction classes having a high agent rank variance and a high AHT variance. A third type of interaction class (Type 3) includes prospective interaction classes having a low agent rank variance and a low AHT variance. A fourth type of interaction class (Type 4) includes prospective interaction classes having a low agent rank variance and a high AHT variance. It should be appreciated that interactions of Type 1 demonstrate similar performance regardless of the abilities and expertise of the agents and, therefore, there may be relative gain from assigning Type 1 interactions to a lower ranked agent, thereby making Type 1 interaction classes suitable candidates for relative gain analysis. Interactions of Type 2 and Type 3 represent generic interaction classes and are similar in that high (low) agent range variance results in a high (low) AHT variance, respectively. Therefore, relative gain analysis is not suitable for those types of interaction classes. Interactions of Type 4 suggests that there are external factors at play, given that the AHT variance is high despite low agent rank variance, and therefore relative gain analysis is likewise not suitable for those types of interaction classes. Although FIG. 5 plots AHT and agent rank in terms of the respective variances, it should be appreciated that similar characteristics may be reflected in a graph involving coefficient of variation or another variance metric.

If the system determines, in block 412, that the criteria are satisfied, the method 400 advances to block 414 in which the system defines the prospective interaction class as an interaction class for relative gain analysis as described herein. If the system determines, in block 412, that one or more of the criteria is not satisfied, the method 400 advances to block 416. In block 416, the system determines whether to analyze another prospective interaction class. If so, the method 400 returns to block 402 in which the system identifies/selects another prospective interaction classes as described above.

Although the blocks 402-416 are described in a relatively serial manner, it should be appreciated that various blocks of the method 400 may be performed in parallel in some embodiments. It should be appreciated that the system may otherwise define the interaction classes in other embodiments (e.g., based on different criteria). For example, the system may otherwise identify simple interactions to be considered as an interaction class for relative gain analysis.

Figure 6:
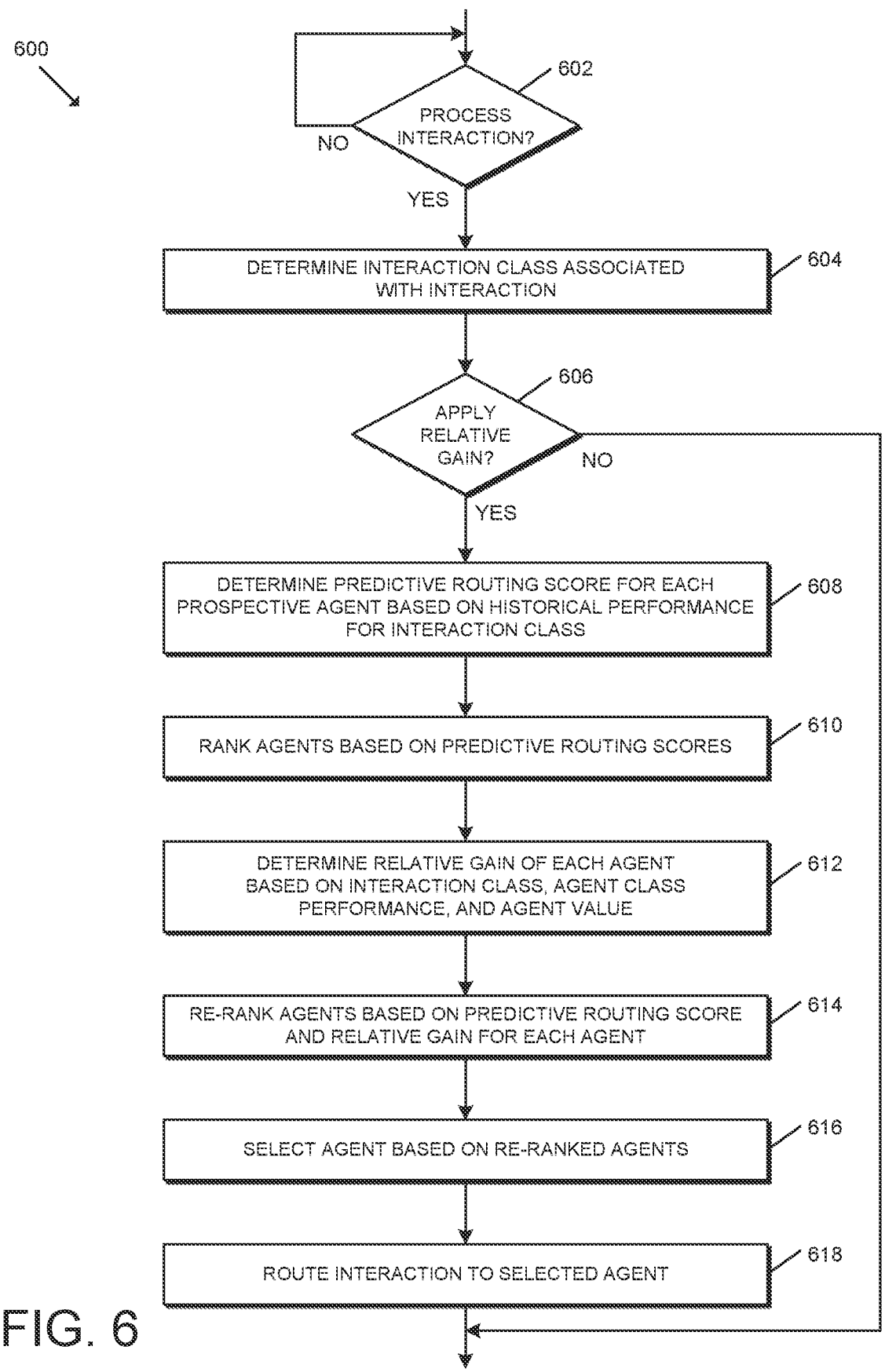
FIG. 6 is a simplified block diagram of at least one embodiment of a method of leveraging relative gain in predictive routing of interactions to contact center agents.

Referring now to FIG. 6, in use, a computing system (e.g., the computing device 100, the contact center system 200, the predictive routing server 300, and/or other computing devices described herein) may execute a method 600 for leveraging relative gain in predictive routing of interactions to contact center agents. It should be appreciated that the particular blocks of the method 600 are illustrated by way of example, and such blocks may be combined or divided, added or removed, and/or reordered in whole or in part depending on the particular embodiment, unless stated to the contrary.

The illustrative method 600 begins with block 602 in which the system determines whether to process an interaction. For example, the system may receive and/or otherwise identify (e.g., via a predictive routing server) an interaction to be routed to a contact center agent. If so, the method 600 advances to block 604 in which the system determines the interaction class associated with the interaction. In block 606, the system determines whether to apply relative gain to the predictive routing analysis based on the interaction class associated with the interaction. As indicated above, the system may include one or more predefined interaction classes (e.g., administrator-defined and/or machine learning-defined) that are eligible/appropriate for relative gain analysis.

If the system determines, in block 606, to apply relative gain, the method 600 advances to block 608 in which the system determines a predictive routing score for each prospective contact center agent to which the interaction can be routed based on the historical performance of each prospective contact center agent. As described herein, it should be appreciated that the system may leverage historical performance data that represents the relative performance of an agent against other agents in a given interaction class over a period of time. In the illustrative embodiment, the predictive routing score is determined to optimize the KPI as described above.

In block 610, the system ranks the prospective contact center agents based on the predictive routing scores. In block 612, the system determines the relative gain for each prospective contact center agent based on the interaction class of the interaction (e.g., including a class value), the agent class performance of the agent, and an agent value of the agent. It should be appreciated that each interaction class may be associated with a class value predefined by the system (e.g., defined by the administrator), and each agent may be associated with an agent value predefined by the system (e.g., defined by the administrator). The class value may be indicative of an estimated value/cost of an interaction within a given interaction class. For example, in an implementation, the system administrator may define an interaction class covering a call to update an account phone number to have a class value of ten dollars and an interaction class covering a churn call to have a class value of one thousand dollars. Similarly, in an implementation, the system administrator may define the value/cost of one less specialized agent to have an agent value of ten dollars per hour and a more specialized agent to have an agent value of twenty dollars per hour. It should be appreciated that the units may vary depending on the particular embodiment and/or territory.

In block 614, the system re-ranks the prospective contact center agents based on the predictive routing score and the relative gain for each agent. For example, in some embodiments, the initial ranking from the predictive routing scores (e.g., based on KPI) may be adjusted to further account for the relative gain determined for each of the agents. It should be appreciated that the re-ranking algorithm may utilize any suitable weighting, thresholds, and/or other techniques to arrive at the re-ranking of prospective agents that incorporates relative gain. Further, although the illustrative embodiment describes incorporating the agents' relative gain as a post-processing step following the predictive routing scores based on KPIs, it should be appreciated that the agents' relative gain may be incorporated into the initial predictive routing scores/ranking in other embodiments.

Figure 7:
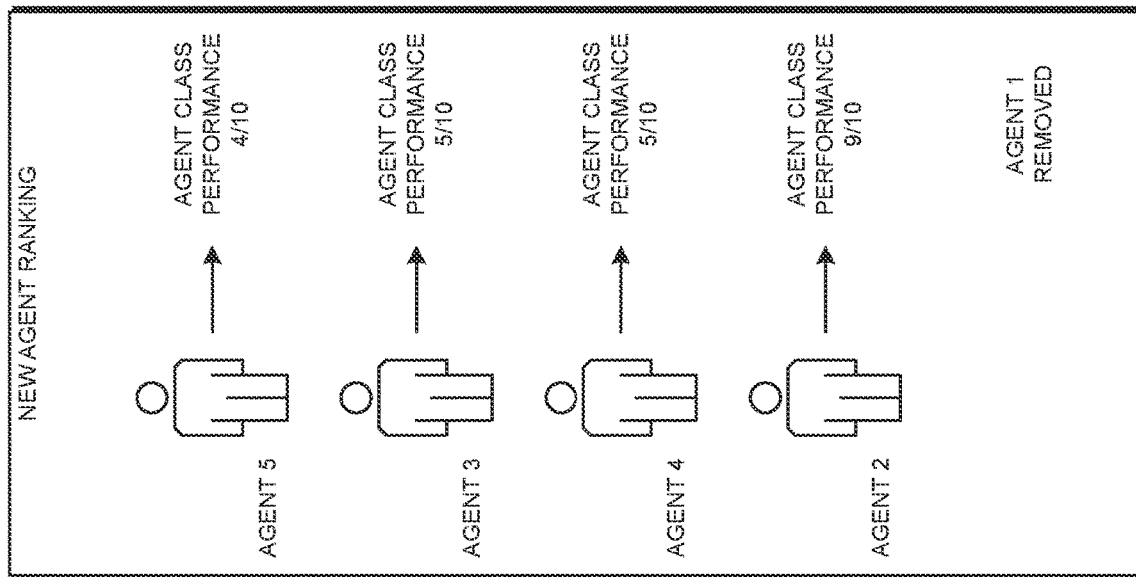
FIG. 7 is a simplified diagram illustrating an exemplary re-ranking of contact center agents based on relative gain.
Figure 7:
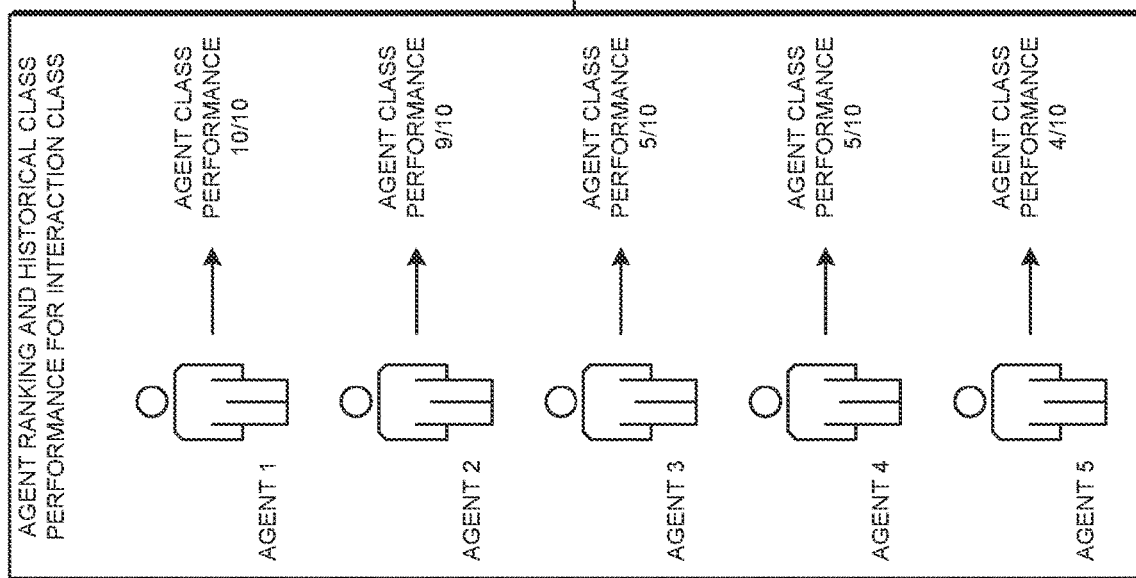

As shown in FIG. 7, an exemplary embodiment depicts five agents being ranked according to their agent class performance (i.e., based on their initial predictive routing scores). More specifically, Agent 1 has an agent class performance score of 10/10, Agent 2 has an agent class performance score of 9/10, Agent 3 has an agent class performance score of 5/10, Agent 4 also has an agent class performance score of 5/10, and Agent 5 has an agent class performance score of 4/10. As shown, the agents are ranked according to highest predictive routing score. However, after incorporating the relative gain and re-routing the agents, Agent 5 has the highest rank, followed by Agent 3, Agent 4, and Agent 2. In the exemplary embodiment, Agent 1 with the highest KPI-based score has been removed from the re-ranking entirely in order to ensure Agent 1 is withheld for a more complex interaction.

Returning to FIG. 6, in block 616, the system selects the contact center agent to which to route the interaction based on the ranking of prospective contact center agents, and in block 618, the system routes the interaction to the selected agent. It should be appreciated that, in the illustrative embodiment, the system selects the contact center agent having the highest ranking after the relative gain has been incorporated into the analysis.

Although the blocks 602-618 are described in a relatively serial manner, it should be appreciated that various blocks of the method 600 may be performed in parallel in some embodiments.

What is claimed is:

1. A method of leveraging relative gain in predictive routing of interactions to contact center agents, the method comprising:
   identifying an interaction to be routed to a contact center agent;
   determining a predictive routing score for each prospective contact center agent of a plurality of prospective contact center agents to which the interaction can be routed based on a historical performance of each prospective contact center agent;
   determining a relative gain for each prospective contact center agent based on an interaction class of the interaction, an agent class performance of the prospective contact center agent, and an agent value of the prospective contact center agent, wherein the relative gain of a respective contact center agent is indicative of a relative optimization improvement of routing the interaction to the respective contact center agent relative to another of the prospective contact center agents;
   ranking the prospective contact center agents based on the associated predictive routing score and the associated relative gain for each prospective contact center agent;
   selecting the contact center agent of the prospective contact center agents based on the ranking of the prospective contact center agents;
   routing the interaction to the selected contact center agent;
   determining the interaction class of the interaction in response to identifying the interaction to be routed to the contact center agent;
   identifying a prospective interaction class;
   determining an average handle time and an agent performance rank of each contact center agent for the identified prospective interaction class based on historical performance data of each contact center agent;
   determining whether relative gain criteria are satisfied based on the average handle time and the agent performance rank of each contact center agent for the identified prospective interaction class; and
   defining the prospective interaction class as an interaction class for relative gain analysis in response to determining that the relative gain criteria are satisfied.

2. The method of claim 1, wherein the historical performance of each prospective contact center agent is associated with a historical performance of the respective prospective contact center agent with handling interactions of the interaction class.

3. The method of claim 1, further comprising ranking the prospective contact center agents based on the associated predictive routing score for each prospective contact center agent to determine a first agent ranking;
   wherein ranking the prospective contact center agents based on the associated predictive routing score and the associated relative gain for each prospective contact center agent comprises re-ranking the first agent ranking based on the associated relative gain for each prospective contact center agent to determine a second agent ranking; and
   wherein selecting the contact center agent of the prospective contact center agents based on the ranking comprises selecting the contact center agent of the prospective contact center agents based on the second agent ranking.

4. The method of claim 1, wherein determining the relative gain for each prospective contact center agent based on the interaction class of the interaction comprises determining the relative gain for each prospective contact center agent based on a class value associated with the interaction class.

5. The method of claim 1, wherein the interaction class is selected from a plurality of interaction classes predefined by an administrator.

6. The method of claim 1, wherein the plurality of interaction classes is defined by machine learning.

7. The method of claim 1, wherein determining whether the relative gain criteria are satisfied comprises:
   determining an agent performance rank variance metric from the agent performance rank of each contact center agent for the identified prospective interaction class; and
   determining an average handle time variance metric from the average handle time of each contact center agent for the identified prospective interaction class.

8. The method of claim 7, wherein the relative gain criteria are satisfied in response to a determination that the agent performance rank variance metric exceeds a first threshold and the average handle time variance metric is less than a second threshold.

9. The method of claim 7, wherein each of the agent performance variance metric and the average handle time variance metric is a coefficient of variation.

10. A system for leveraging relative gain in predictive routing of interactions to contact center agents, the system comprising:
    at least one processor; and
    at least one memory comprising a plurality of instructions stored therein that, in response to execution by the at least one processor, causes the system to:
       identify an interaction to be routed to a contact center agent;
       determine a predictive routing score for each prospective contact center agent of a plurality of prospective contact center agents to which the interaction can be routed based on a historical performance of each prospective contact center agent;

determine a relative gain for each prospective contact center agent based on an interaction class of the interaction, an agent class performance of the prospective contact center agent, and an agent value of the prospective contact center agent, wherein the relative gain of a respective contact center agent is indicative of a relative optimization improvement of routing the interaction to the respective contact center agent relative to another of the prospective contact center agents;

rank the prospective contact center agents based on the associated predictive routing score and the associated relative gain for each prospective contact center agent;

select the contact center agent of the prospective contact center agents based on the ranking of the prospective contact center agents;

route the interaction to the selected contact center agent;

determine the interaction class of the interaction in response to identifying the interaction to be routed to the contact center agent;

identify a prospective interaction class;

determine an average handle time and an agent performance rank of each contact center agent for the identified prospective interaction class based on historical performance data of each contact center agent;

determine whether relative gain criteria are satisfied based on the average handle time and the agent performance rank of each contact center agent for the identified prospective interaction class; and define the prospective interaction class as an interaction class for relative gain analysis in response to determining that the relative gain criteria are satisfied.

11. The system of claim 10, wherein the historical performance of each prospective contact center agent is associated with a historical performance of the respective prospective contact center agent with handling interactions of the interaction class.

12. The system of claim 10, wherein the plurality of instructions further causes the system to rank the prospective contact center agents based on the associated predictive routing score for each prospective contact center agent to determine a first agent ranking;

wherein to rank the prospective contact center agents based on the associated predictive routing score and the associated relative gain for each prospective contact center agent comprises to re-rank the first agent ranking based on the associated relative gain for each prospective contact center agent to determine a second agent ranking; and wherein to select the contact center agent of the prospective contact center agents based on the ranking comprises to select the contact center agent of the prospective contact center agents based on the second agent ranking.

13. The system of claim 10, wherein to determine the relative gain for each prospective contact center agent based on the interaction class of the interaction comprises to determine the relative gain for each prospective contact center agent based on a class value associated with the interaction class.

14. The system of claim 10, wherein the interaction class is selected from a plurality of interaction classes predefined by an administrator.

15. The system of claim 10, wherein to determine whether the relative gain criteria are satisfied comprises to:

determine an agent performance rank variance metric from the agent performance rank of each contact center agent for the identified prospective interaction class; and determine an average handle time variance metric from the average handle time of each contact center agent for the identified prospective interaction class.

16. The system of claim 15, wherein the relative gain criteria are satisfied in response to a determination that the agent performance rank variance metric exceeds a first threshold and the average handle time variance metric is less than a second threshold.

* * * * *